United States Patent
Seki et al.

(10) Patent No.: US 12,084,354 B2
(45) Date of Patent: Sep. 10, 2024

(54) CALCIUM TITANATE POWDER, METHOD FOR PRODUCING SAME AND EXTERNAL TONER ADDITIVE FOR ELECTROPHOTOGRAPHY

(71) Applicant: TITAN KOGYO KABUSHIKI KAISHA, Ube (JP)

(72) Inventors: Toshimasa Seki, Yamaguchi (JP); Takayasu Tanaka, Yamaguchi (JP); Wataru Mino, Yamaguchi (JP); Toshiyuki Koga, Yamaguchi (JP); Tomoko Yoshimi, Yamaguchi (JP)

(73) Assignee: TITAN KOGYO KABUSHIKI KAISHA, Ube (JP)

(*) Notice: Subject to any disclaimer, the term of this patent is extended or adjusted under 35 U.S.C. 154(b) by 655 days.

(21) Appl. No.: 17/260,895

(22) PCT Filed: Jul. 11, 2019

(86) PCT No.: PCT/JP2019/027430
§ 371 (c)(1),
(2) Date: Jan. 15, 2021

(87) PCT Pub. No.: WO2020/017419
PCT Pub. Date: Jan. 23, 2020

(65) Prior Publication Data
US 2021/0292182 A1 Sep. 23, 2021

(30) Foreign Application Priority Data
Jul. 17, 2018 (JP) .................................. 2018-133928

(51) Int. Cl.
*C01G 23/04* (2006.01)
*C01G 23/00* (2006.01)
*G03G 9/09* (2006.01)

(52) U.S. Cl.
CPC ............ *C01G 23/04* (2013.01); *C01G 23/006* (2013.01); *G03G 9/0902* (2013.01); *C01P 2002/34* (2013.01); *C01P 2006/64* (2013.01)

(58) Field of Classification Search
CPC .... C01G 23/04; C01G 23/006; G03G 9/0902; G03G 9/09716; G03G 9/09708;
(Continued)

(56) References Cited

U.S. PATENT DOCUMENTS

| 2006/0229197 A1 | 10/2006 | Stark et al. |
| 2009/0152513 A1 | 6/2009 | Lu et al. |
| 2018/0267416 A1 | 9/2018 | Uchino et al. |

FOREIGN PATENT DOCUMENTS

| CN | 107807498 A | 3/2018 |
| CN | 108530057 A | 9/2018 |

(Continued)

OTHER PUBLICATIONS

Mao et al (Composition and Shape Control of Crystalline Ca1−x−SrxTiO3 Perovskite Nanoparticles, Advanced Materials, 2005) (Year: 2005).*

(Continued)

*Primary Examiner* — Colin W. Slifka
*Assistant Examiner* — Logan Edward Laclair
(74) *Attorney, Agent, or Firm* — Oblon, McClelland, Maier & Neustadt, L.L.P.

(57) ABSTRACT

A powder which is composed of particles that are mainly composed of calcium titanate having a perovskite crystal structure, and primary particles of which have a generally spherical shape and an average particle diameter within the range of from 20 nm to 100 nm (inclusive). This powder is produced by a method which comprises: the production of calcium titanate by subjecting a mixed liquid that contains a sugar, an alkali, a water-soluble compound containing cal- (Continued)

cium, and a compound which is obtained by deflocculating a hydrolysis product of a titanium compound with use of a monobasic acid to a high-pressure liquid-phase reaction that includes heating to a temperature of from 100° ° C. to 270° C. (inclusive),; and a subsequent calcium removal treatment.

7 Claims, 1 Drawing Sheet

(58) Field of Classification Search
CPC .. G03G 9/097; C01P 2002/34; C01P 2006/64; C01P 2004/04; C01P 2004/32; C01P 2004/51; C01P 2004/64; C01P 2006/12; C01P 2006/80
See application file for complete search history.

(56) References Cited

FOREIGN PATENT DOCUMENTS

| JP | 59-45927 A | 3/1984 |
|---|---|---|
| JP | 2004-323344 A | 11/2004 |
| JP | 2005-321431 A | 11/2005 |
| JP | 2007-91549 A | 4/2007 |
| JP | 2008-96821 A | 4/2008 |
| JP | 2008-297142 A | 12/2008 |
| JP | 2008-304723 A | 12/2008 |
| JP | 2008-304727 A | 12/2008 |
| JP | 2008-304747 A | 12/2008 |
| JP | 2009-192696 A | 8/2009 |
| JP | 2009186636 A * | 8/2009 |
| JP | 2009-540067 A | 11/2009 |
| JP | 4671618 B2 | 4/2011 |
| JP | 2013-25223 A | 2/2013 |
| JP | 2018-155912 A | 10/2018 |
| WO | WO 2004/103900 A1 | 12/2004 |

OTHER PUBLICATIONS

Translation of JP-2009186636-A (Year: 2008).*
Mao, Y. et al., "Composition and Shape Control of Crystalline $Ca_{1-x}Sr_xTiO_3$ Perovskite Nanoparticles**," Advanced Materials, 2005, vol. 17, pp. 2194-2199.
International Search Report issued on Sep. 17, 2019 in PCT/JP2019/027430 filed on Jul. 11, 2019, 2 pages.
Extended European Search Report issued on May 6, 2022 in European Patent Application No. 19837323.5, 8 pages.

* cited by examiner

CALCIUM TITANATE POWDER, METHOD FOR PRODUCING SAME AND EXTERNAL TONER ADDITIVE FOR ELECTROPHOTOGRAPHY

TECHNICAL FIELD

The present invention relates to a calcium titanate powder useful as an additive for a toner, particularly as an external additive for a toner. The present invention also relates to a toner for electrostatic recording using the calcium titanate powder.

BACKGROUND ART

Titanium dioxide powder is used as a white pigment having a strong hiding power, and is used in various fields, such as paints, inks, plastics, cosmetics, and photocatalysts due to its ultraviolet blocking ability and photocatalytic function. It is also used as an external additive for a toner for electrophotography for the purpose of adjusting charge, fluidizing, preventing fusion, and the like.

In copiers and printers using an electrophotographic system, there is a demand for high definition and high image quality of images, and there is also a demand for stability (weather resistance) over a long period of time. For example, since the main component of the base particles of the toner is a thermoplastic resin, the base particles of the toner are fused to each other and the fluidity of the toner deteriorates at a high temperature. When the base particles of the toner are fused to each other and the fluidity is lowered, the toner cannot maintain an appropriate charged state and the image quality is lowered. Spherical or granular titanium dioxide fine particles are used to prevent the toner base particles from coming into contact with each other and to maintain the fluidity.

However, in a list of information on carcinogenic risk provided by IARC (International Agency for Research on Cancer), the rank of titanium dioxide has been changed from Group 3 (not classifiable as to its carcinogenicity to humans) to Group 2B (possibly carcinogenic to humans), and development of a material as an alternative to titanium dioxide is desired.

Calcium titanate having a perovskite-type structure is used as an abrasive in some electrophotographic toners, and is also being considered as an external additive for a toner for electrophotography for the purpose of adjusting charge, fluidizing, preventing fusion, and the like.

As a method for producing calcium titanate, a wet synthesis method in which a hydrolysis product of a titanium compound is reacted with a water-soluble calcium salt in a strong alkaline aqueous solution is disclosed (Patent Literature 1). However, the resulting calcium titanate is coarse particles with a size of 1 μm to 3 μm.

Also disclosed is a method for producing perovskite-type calcium titanate by heating under normal pressure or heating under increased pressure using an autoclave. However, the obtained calcium titanate is a square prism or square prism-like particle having an average particle size of primary particles of 0.26 μm to 0.42 μm (Patent Literature 2) or a rectangular parallelepiped particle having a long side length of 0.05 μm to 0.35 μm and a short side length of 0.04 μm to 0.20 μm (Patent Literature 3).

Titanium dioxide used as a fluidizing agent for an electrophotographic toner is substantially spherical and has a particle size of 100 nm or less, while calcium titanate particles proposed so far are cubic or rectangular parallelepiped particles having pointed angles and have a large particle size. A performance as a charge adjusting agent and a fusion-preventing agent for a toner for electrophotography, particularly as a fluidizing agent, of such calcium titanate particles is inferior to that of the titanium dioxide fine particles having substantially spherical shapes.

CITATION LIST

Patent Literature

PTL 1: Japanese Patent Laid-Open No. 59-045927
PTL 2: Japanese Patent Laid-Open No. 2004-323344
PTL 3: Japanese Patent Laid-Open No. 2008-297142

SUMMARY OF INVENTION

Technical Problem

Calcium titanate fine particles having an average particle size of primary particles of 100 nm or less have not been reported so far, and there has been no toner for electrophotography using calcium titanate as a charge adjusting agent, a fluidizing agent, or a fusion-preventing agent.

Accordingly, it is an object of the present invention to provide a calcium titanate powder which is suitable as an alternative material to titanium dioxide, particularly as an external additive for a toner for electrophotography for improving fluidization and preventing fusion and the like, a method for producing the same, and an external additive for a toner for electrophotography using the calcium titanate powder.

Solution to Problem

The present inventors have paid attention to calcium titanate as an alternative material to titanium dioxide used for a toner for electrophotography, and investigated a method to obtain a shape and a particle size suitable as an external additive, particularly as a fluidizing agent, for a toner for electrophotography, and as a result, found that a substantially spherical and fine calcium titanate powder can be obtained by adding a sugar in calcium titanate synthesis by a high-pressure liquid phase reaction method.

Furthermore, it has been found that the toner for electrophotography in which the calcium titanate powder or the powder obtained by coating the calcium titanate with a silicone or a silane coupling agent is incorporated as an external additive has good fluidity.

The present invention includes, but is not limited to, the following aspects:
 (1) A powder composed of particles, the particles comprising calcium titanate having a perovskite-type crystal structure as a main component, wherein a shape of primary particles is substantially spherical, and an average particle size of the primary particles is in a range of 20 nm or more and 100 nm or less.
 (2) The powder according to (1), wherein a molar ratio of calcium to titanium in the particles is in a range of 0.50 or more and 0.90 or less, and the particles do not contain titanium dioxide.
 (3) The powder according to (1) or (2), wherein a value obtained by dividing a volume-based quartile deviation of particle size of the primary particles by the average particle size of the primary particles is 0.250 or less.

(4) The powder according to any one of (1) to (3), wherein the particles contain carbon (C) in a range of 10.0 g/kg or more and 50.0 g/kg or less.

(5) The powder according to any one of (1) to (4), wherein the particles contain silicone or a silane coupling agent in a range of 1.00 g/kg or more and 10.00 g/kg or less in terms of silicon (Si).

(6) An external additive for a toner for electrophotography, comprising the powder according to any one of (1) to (5).

(7) A method for producing the powder according to (1), comprising:
providing a mixed solution containing a compound obtained by deflocculating a hydrolysate of a titanium compound with a monobasic acid, a water-soluble compound containing calcium, a sugar, and an alkali;
subjecting the mixed solution to a high-pressure liquid phase reaction method to obtain calcium titanate; and
subjecting the obtained calcium titanate to a calcium removal treatment, wherein a temperature in the high-pressure liquid phase reaction method is 100° C. or more and 270° C. or less.

Effects of Invention

The powder composed of particles containing calcium titanate as a main component (also simply referred to as "calcium titanate powder" in the present specification) of the present invention is produced by subjecting a mixed solution containing a compound obtained by deflocculating a hydrolysate of a titanium compound with a monobasic acid, a water-soluble compound containing calcium, a sugar, and an alkali to a high-pressure liquid phase reaction method comprising heating the mixed solution to 100° C. or more and 270° C. or less. The obtained calcium titanate powder is composed of particles containing calcium titanate having a perovskite-type crystal structure as a main component, and the shape of primary particles is substantially spherical, and the average particle size of the primary particles is 20 nm or more and 100 nm or less. Since the calcium titanate powder of the present invention is substantially spherical and has a fine particle size, it is possible to prevent contact and condensation between the toner base particles. Also being able to impart fluidity, the calcium titanate powder of the present invention is suitable as an external additive for a toner for electrophotography.

DESCRIPTION OF EMBODIMENTS

A calcium titanate powder of the present invention is composed of particles containing titanate compound having a perovskite-type crystal structure as a main component, and the shape of primary particles is substantially spherical, and the average particle size of the primary particles is 20 nm or more and 100 nm or less. The calcium titanate powder of the present invention preferably has a molar ratio of calcium (Ca) to titanium (Ti) in the particles (Ca/Ti) in the range of 0.50 or more and 0.90 or less, and does not contain titanium dioxide. The Ca/Ti is more preferably 0.60 or more and 0.80 or less. Further, the value obtained by dividing the volume-based quartile deviation of particle size of the primary particles by the average particle size of the primary particles is preferably 0.250 or less, and more preferably 0.230 or less. Further, in the calcium titanate powder of the present invention, the particles preferably contain carbon (C) in the range of 10.0 g/kg or more and 50.0 g/kg or less, and more preferably 15.0 g/kg or more and 40.0 g/kg or less. Furthermore, the calcium titanate powder of the present invention preferably contains a silicone or a silane coupling agent in the range of 1.00 g/kg or more and 10.00 g/kg or less in terms of silicon (Si).

Figure 1:
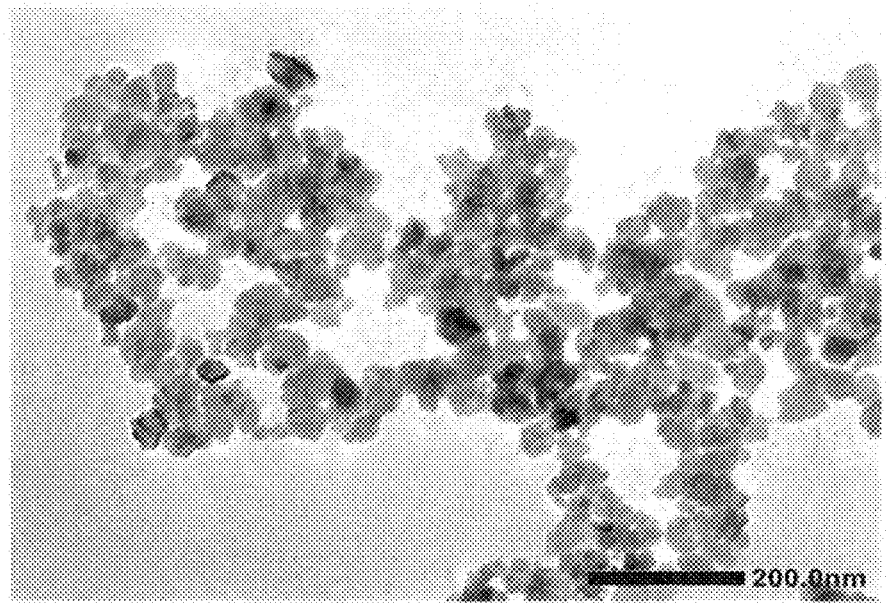
FIG. 1 is a transmission electron micrograph (observation magnification 50,000 times) of the calcium titanate powder produced in Example 5.
Figure 2:
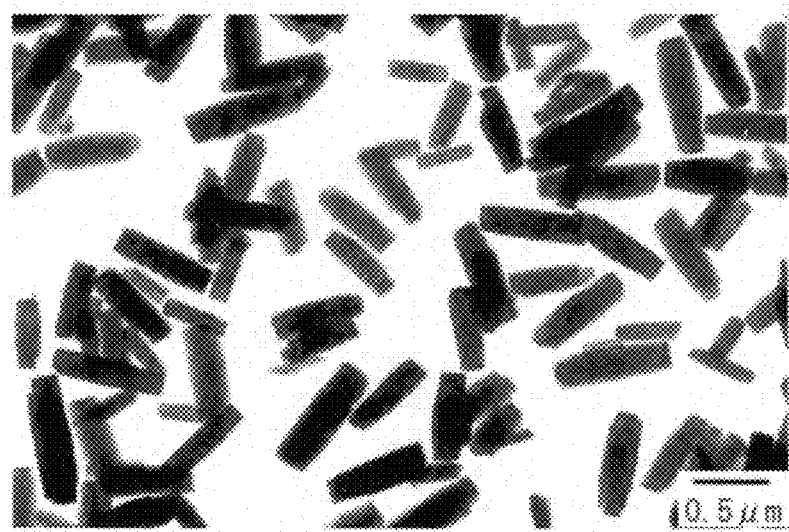
FIG. 2 is a transmission electron micrograph (observation magnification 10,000 times) of the calcium titanate powder produced in Comparative Example 1.

In the present specification, "the shape of primary particles is substantially spherical" means that the primary particle has an irregular shape or an outer shape close to a spherical shape as shown in FIG. 1. Further, the "substantially spherical" means that the primary particle does not have a shape like, for example, a rectangular parallelepiped shape as seen in FIG. 2, a shape having clear corners, such as a cube or a prism, or a shape elongated in a specific direction, such as a needle shape or a plate shape. The particles constituting the powder of the present invention preferably have an aspect ratio in the range of 1.0 or more and 1.8 or less, and more preferably 1.0 or more and 1.5 or less. The aspect ratio is the ratio of the short axis to the long axis of the particle and can be calculated by measuring the short axis and the long axis of the primary particle image by electron microscope observation.

The "average particle size of the primary particles" means the 50% particle size based on the volume determined by measuring the diameter of the primary particle image by electron microscope observation. When the average particle size of the primary particles is out of the above range, the fluidity of the toner decreases, which is not preferable.

The "powder composed of particles containing calcium titanate having a perovskite-type crystal structure as a main component" means that the individual particles constituting the powder of the present invention mainly comprise calcium titanate having a perovskite-type crystal structure. "Mainly comprising calcium titanate having a perovskite-type crystal structure" or "containing calcium titanate having a perovskite-type crystal structure as a main component" means that, although not limited to, 90% by mass or more, preferably 95% by mass or more of the individual particles constituting the powder are calcium titanate having a perovskite-type crystal structure. In addition to calcium titanate, the individual particles constituting the powder of the present invention may contain carbon derived from sugar or a coating of silicone or a silane coupling agent.

A "powder" is a cluster of particles. The powder of the present invention is constituted by gathering particles containing calcium titanate having a perovskite-type crystal structure as a main component. The powder may contain unavoidable impurities, and the powder containing such unavoidable impurities is also included in the powder of the present invention as long as it satisfies the other features of the present invention. The powder may also be mixed with other agents when the powder is used. In a case where the particles containing calcium titanate as a main component in the obtained mixture satisfy the constitution of the present invention, it can be considered that the powder of the present invention has been used in the mixture.

The "volume-based quartile deviation of particle size of the primary particles" is the half of the difference between the 75% particle size and the 25% particle size based on the volume determined by measuring the diameter of the primary particle image by electron microscope observation. The "value obtained by dividing the volume-based quartile deviation of particle size of the primary particles by the average particle size of the primary particles" is an index of the particle size distribution, and as this value becomes smaller, the particle size distribution becomes narrower.

The calcium titanate powder of the present invention is typically produced by heating a mixed solution containing a compound obtained by deflocculating a hydrolysate of a titanium compound with a monobasic acid, a water-soluble compound containing calcium, a sugar, and an alkali to 100° C. or more and 270° C. or less in a high-pressure liquid phase reaction method to obtain fine particles containing calcium titanate as a main component, and then subjecting the obtained fine particles containing calcium titanate as a main component to a calcium removal treatment.

[High-Pressure Liquid Phase Reaction Method]

As the compound obtained by deflocculating a hydrolysate of a titanium compound with a monobasic acid (hereinafter, also simply referred to as "deflocculated product"), it is preferable to use a compound obtained by using a compound which is metatitanic acid obtained by the sulfuric acid method and has an $SO_3$ content of 15 g/kg or less, preferably 10 g/kg or less as a hydrolysate of a titanium compound and deflocculating the hydrolysate by adjusting the pH to 0.8 or more and 1.5 or less using hydrochloric acid. As a result, calcium titanate particles having a narrow particle size distribution can be obtained. When the $SO_3$ content in metatitanic acid exceeds 15 g/kg, deflocculation may not proceed. As the monobasic acid, nitric acid, hydrogen bromide, hydrogen iodide, formic acid, acetic acid and the like can be used in addition to hydrochloric acid.

As the water-soluble compound containing calcium, calcium nitrate, calcium chloride, calcium hydroxide and the like can be preferably used. As the alkali, caustic alkalis can be used, and sodium hydroxide is particularly preferable.

As the sugar, monosaccharides and disaccharides, such as glucose, fructose, glyceraldehyde, maltose, lactose, arabinose, cellobiose, sucrose, and trehalose can be suitably used. By adding these sugars in a high-pressure liquid phase reaction method, the shape of the calcium titanate particles produced can be made substantially spherical and the particle size can be reduced. The particles constituting the powder of the present invention may contain carbon derived from these sugars. The amount of carbon in the particles constituting the powder of the present invention is preferably in the range of 10.0 g/kg or more and 50.0 g/kg or less, and more preferably in the range of 15.0 g/kg or more and 40.0 g/kg or less. The amount of carbon can be adjusted by the amount of sugar added during the high-pressure liquid phase reaction.

In the above-described method, factors affecting the shape and particle size of the obtained particles containing calcium titanate as a main component include the concentrations and mixing ratio of the raw materials, the concentration of alkali, and the reaction temperature in the high-pressure liquid phase reaction method.

The mixing ratio of the deflocculated product and the water-soluble compound containing calcium in the high-pressure liquid phase reaction is appropriately adjusted so that the molar ratio of Ca/Ti is 1.00 or more and 1.60 or less, preferably 1.10 or more and 1.50 or less. Since the deflocculated product has low solubility in water, when the Ca/Ti molar ratio is less than 1.00, unreacted titanium oxide tends to remain in the reaction product. The suitable concentration of the deflocculated product in the high-pressure liquid phase reaction is 0.5 mol/L or more and 1.5 mol/L or less, preferably 0.7 mol/L or more and 1.4 mol/L or less in terms of Ti.

The suitable sugar concentration during the high-pressure liquid phase reaction is 0.030 mol/L or more and 0.500 mol/L or less, preferably 0.050 mol/L or more and 0.350 mol/L or less. Outside the concentration range, titanium dioxide tends to remain. Fine calcium titanate may not be obtained at less than 0.030 mol/L.

The concentration of alkali during the high-pressure liquid phase reaction is preferably in the range of 0.1 mol/L or more, more preferably 0.5 mol/L or more and 2.3 mol/L or less.

The temperature during the high-pressure liquid phase reaction is 100° C. or more and 270° ° C. or less, more preferably 120° C. or more and 200° C. or less. When the temperature is less than 100° C., it is difficult to obtain fine calcium titanate, and when the temperature exceeds 270° ° C., the pressure increases, and the equipment cost of the reaction vessel that can withstand the pressure becomes high. The reaction time varies depending on the temperature, but is preferably 1 hour or longer and 20 hours or shorter. The reactor is not particularly limited as long as it can achieve a predetermined temperature and pressure. For example, a normal autoclave device can be used. The pressure during the high-pressure liquid phase reaction is not particularly limited as long as it can achieve a predetermined temperature.

[Calcium Removal Treatment]

After calcium titanate is produced by the high-pressure liquid phase reaction method, a calcium removal treatment is performed. When the molar ratio of Ca/Ti exceeds 1.00 in the calcium titanate powder obtained by the high-pressure liquid phase reaction, unreacted calcium remaining after completion of the reaction may react with carbon dioxide in air to generate impurity particles, such as calcium carbonate. When these impurity particles remain in the powder, the particle size distribution of the powder may widen. Further, when impurities, such as calcium carbonate remain on the surface of the particles, uniform coating for imparting hydrophobicity with the surface treatment agent may not be performed due to the influence of the impurities in the surface treatment. Therefore, the calcium removal treatment is performed to remove unreacted calcium.

Furthermore, in the calcium removal treatment, in order to prevent the formation of titanium dioxide, it is preferable to adjust the molar ratio of calcium to titanium (Ca/Ti) in the calcium titanate powder to 0.50 or more and 0.90 or less and to make the particle surface in a state in which calcium is less than the theoretical stoichiometric ratio of calcium to titanium of calcium titanate. The molar ratio is more preferably 0.60 or more and 0.80 or less. As a result of adopting the preferable molar ratio, more uniform coating with the organic surface treatment agent can be performed, and good charge stability and fluidity can be imparted to the toner.

The calcium removal treatment includes adjusting the pH to 2.5 or more and 7.0 or less, more preferably 4.5 or more and 6.0 or less using an acid. As the acid, hydrochloric acid, nitric acid, acetic acid and the like can be used. However, sulfuric acid is not preferable because calcium sulfate, which has low solubility in water, is generated.

In the present invention, the calcium titanate powder may be surface-coated with an inorganic oxide, such as silicon dioxide, dialuminum trioxide, or aluminum oxyhydroxide, or a hydrophobizing agent, such as a fatty acid, a titanium coupling agent, a silane coupling agent, or a silicone oil in order to adjust the charge and improve environmental stability, in the same manner as titanium dioxide or silica conventionally used as an external additive. In particular, surface-coating with a silicone or a silane coupling agent is preferable because the toner fluidity is improved. The silicone or silane coupling agent is preferably applied to the powder of the present invention in the range of 1.00 g/kg or more and 10.00 g/kg or less in terms of silicon (Si). When used as an external additive for a toner for electrophotography, the calcium titanate powder is preferably dispersed in a liquid phase and coated with a hydrophobizing agent in the liquid phase, because the dispersibility of calcium titanate when externally added to the toner is improved.

The calcium titanate powder of the present invention can be used in any electrostatic recording method including a magnetic one-component toner, a magnetic two-component toner, and a non-magnetic one-component toner. It can also be used as an external additive for a toner produced by the pulverization method or the polymerization method. The binder resin for the toner is not particularly limited, and a synthetic resin or a natural resin commonly used for a toner may be used. Specific examples thereof include styrene resins, acrylic resins, olefin resins, diene resins, polyester resins, polyamide resins, epoxy resins, silicone resins, phenol resins, petroleum resins, and urethane resins. Further, additives such as a charge adjusting agent and a releasing agent may also be added to the binder depending on the purpose.

The external additive containing the calcium titanate powder of the present invention is preferably added to the toner at a ratio of 3 g/kg or more and 50 g/kg or less with respect to the total mass of the toner including the binder. If necessary, one or more known fluidizing agents used in the field of electrophotography, such as silicon dioxide, dialuminum trioxide, and the like, may be used in combination, or other external additives may be used in combination.

EXAMPLES

Hereinafter, the present invention will be described in more detail with reference to Examples. Examples given below are provided for illustration purposes only and do not limit the scope of the present invention.

[Measurement Method]

In the present invention, the shape and average particle size of the primary particles of the calcium titanate powder, quartile deviation, carbon (C) amount, silicon (Si) amount, Ca/Ti molar ratio, specific surface area, apparent toner density improvement rate, and the like were measured by the following method.

[Shape of Primary Particles] and [Average Particle Size of Primary Particles]

The shape of the primary particles was determined by observing with a transmission electron microscope JEM-1400plus manufactured by JEOL Ltd. The average particle size of the primary particles is the 50% particle size based on the volume. The particle diameter of the primary particles was determined by matching the circle diameter of about 200 primary particles in the observation field using the transmission electron microscope JEM-1400plus manufactured by JEOL Ltd with the reference circle diameter (4 mm to 10 mm) of Particle Size Analyzer TGZ-3 manufactured by Carl Zeiss. The observation magnification was changed according to the size of the particles to be measured. For example, when particles having an average particle size of primary particles in the range of 150 nm to 200 nm are observed at a magnification of 30000 times (observation magnification of optical microscope: 10000 times×printing: 3 times), the particles fall within the range of the reference circle size (4 mm to 10 mm) of Particle Size Analyzer manufactured by Carl Zeiss. Similarly, when particles having an average particle size of primary particles in the range of 200 nm to 500 nm are observed at a magnification of 20000 times (observation magnification of optical microscope: 10000 times×printing: 2 times), when particles having an average particle size of primary particles in the range of 80 nm to 150 nm are observed at the magnification of 50000 times (observation magnification of optical microscope: 20000 times×printing: 2.5 times), when particles having an average particle size of primary particles in the range of 40 nm to 80 nm are observed at the magnification of 100000 times (observation magnification of optical microscope: 30000 times×printing: 10/3 times), and when particles having an average particle size of primary particles are in the range of 20 nm to 40 nm and the magnification is set to 200000 times (observation magnification of optical microscope: 100000 times×printing: 2 times), the particles fall within the range of the reference circle size (4 mm to 10 mm). When matching of the sizes of the particles to be measured to the reference circular range is not performed, measurement errors become large due to existence of too large or too small particles.

[Quartile Deviation]

The quartile deviation was represented by the half of the difference between the 75% particle size and the 25% particle size based on volume measured by the method described above from a transmission electron micrograph.

[Amount of Carbon (C)]

The amount of carbon (C) in the sample was analyzed using a LECO CS-230 carbon and sulfur analyzer.

[Amount of Silicon (Si)] and [Ca/Ti Molar Ratio]

The count value of each element was measured using an X-ray fluorescence analyzer XRF-1700 manufactured by Shimadzu Corporation, and the amount of silicon and the Ca/Ti molar ratio was calculated by a fundamental parameter method (JIS K0119:2008). [X-ray diffraction]

The X-ray diffraction pattern was measured by X-ray diffractometer RINT-TTR III manufactured by Rigaku, and the constituent phases were identified by analysis software.

[Specific Surface Area]

The specific surface area was measured by the BET method using Gemini 2375 manufactured by MICROMETORICS INSTRUMENT CO.

[Apparent Toner Density Improvement Rate]

A sample of 5 g/kg was added to a black toner that contains no external additive, has a median size of 7.5 μm based on volume, is obtained by a pulverization method, and contains polyacrylic styrene as a resin component. The obtained mixture was stirred using a sample mill SK-M 10S manufactured by Kyoritsu Riko Co., Ltd. to obtain an external additive added toner. The bulk densities of the toner to which no external additive was added and the toner to which an external additive was added were measured by the static method of JIS K 5101-12-1:2004. When the bulk density of the toner to which no external additive is added is p1 and the bulk density of the toner to which the sample is added is p2, the apparent toner density improvement rate of the toner is defined by the following Formula (1):

Apparent density improvement rate (%)=(p2−p1)/p1×100  Formula (1)

Example 1

Metatitanic acid obtained by the sulfuric acid method was bleached and subjected to deironization, and then an aqueous solution of sodium hydroxide was added to adjust the pH to 9.0, followed by desulfurization, neutralization to pH 5.8 with hydrochloric acid, and filtration washing to obtain a washed cake of metatitanic acid having a $SO_3$ content of 9.3 g/kg. Water was added to the washed cake to make a slurry having a Ti content of 2.13 mol/L, and then hydrochloric acid was added to adjust the pH to 1.4 to perform a deflocculation treatment. Metatitanium acid, which is a deflocculated product, in an amount of 0.764 mol in terms of $TiO_2$ was collected and charged into a reaction vessel. To this was added calcium hydroxide at a Ca/Ti molar ratio of 1.15, followed by addition of 0.044 mol glucose, addition of 0.9 mol sodium hydroxide, and addition of water to a total volume of 0.6 L, and the mixed solution was stirred for 30 minutes.

The mixed solution was heated to 150° C. while stirring and mixing, and stirring was continued for 10 hours to complete the reaction. The reaction-completed slurry was cooled to 50° C., and hydrochloric acid was added until the pH reached 5.0, and stirring was continued for another 1 hour. The obtained precipitate was washed by decantation, separated by filtration, and dried in the air at 120° C. for 10 hours to obtain a calcium titanate powder. The shape of the primary particles of the calcium titanate powder was substantially spherical, the average particle size was 61 nm, the value obtained by dividing the quartile deviation by the average particle size was 0.189, the carbon (C) content was 18.6 g/kg, the silicon (Si) content was 0.02 g/kg, the Ca/Ti molar ratio was 0.65, and the specific surface area was 61 $m^2/g$. According to the powder X-ray diffraction method, the powder contained calcium titanate having a perovskite-type crystal structure as a main component, and the titanium dioxide phase was not identified. The improvement rate of the apparent toner density was 0.4%.

Example 2

From the slurry for which the decantation cleaning was completed in Example 1, 20 g of calcium titanate was collected, and the concentration of calcium titanate in the slurry was adjusted to 150 g/L. The pH of the slurry was adjusted to a range of 5.5 or more and 6.0 or less, and 0.1 g of SM 7060 (active ingredient 600 g/kg), which is a silicone emulsion manufactured by Toray Dow Corning, was added as a surface treatment agent, followed by stirring for 1 hour. After the solid-liquid separation by filtration and washing, the mixture was dried at 120° C. for 12 hours to obtain a calcium titanate powder. The shape of the primary particles of the calcium titanate powder was substantially spherical, the average particle size was 60 nm, the value obtained by dividing the quartile deviation by the average particle size was 0.190, the carbon (C) content was 18.8 g/kg, the silicon (Si) content was 1.30 g/kg, the Ca/Ti molar ratio was 0.65, and the specific surface area was 62 $m^2/g$. According to the powder X-ray diffraction method, the powder contained calcium titanate having a perovskite-type crystal structure as a main component, and the titanium dioxide phase was not identified. The improvement rate of the apparent toner density was 3.9%.

Example 3

A calcium titanate powder was obtained in the same manner as in Example 1 except that the amount of glucose added was changed to 0.167 mol.

Example 4

Using the slurry for which decantation cleaning was completed in Example 3, silicone treatment was performed in the same manner as in Example 2 to obtain a calcium titanate powder.

Example 5

A calcium titanate powder was obtained in the same manner as in Example 1 except that the amount of glucose added was changed to 0.148 mol, the temperature of the high-pressure liquid phase reaction was changed to 180°C, and the stirring was changed to 3 hours. A transmission electron micrograph of the calcium titanate powder according to Example 5 is shown in FIG. 1.

Example 6

Using the slurry for which decantation cleaning was completed in Example 5, silicone treatment was performed in the same manner as in Example 2 to obtain a calcium titanate powder.

Example 7

A calcium titanate powder was obtained in the same manner as in Example 6 except that the surface treatment agent was changed to XIAMETER® OFS-2306 Silane manufactured by Toray Dow Corning, which is i-butyltrimethoxysilane, and 2.06 g thereof was added thereto.

Example 8

A calcium titanate powder was obtained in the same manner as in Example 5 except that glucose was changed to fructose.

Example 9

Using the slurry for which decantation cleaning was completed in Example 8, silicone treatment was performed in the same manner as in Example 2 to obtain a calcium titanate powder.

Example 10

A calcium titanate powder was obtained in the same manner as in Example 9 except that the surface treatment agent was changed to XIAMETER OFS-2306 Silane manufactured by Toray Dow Corning, which is i-butyltrimethoxysilane, and 1.54 g thereof was added thereto.

Example 11

A calcium titanate powder was obtained in the same manner as in Example 5 except that glucose was changed to maltose.

Example 12

Using the slurry for which decantation cleaning was completed in Example 11, silicone treatment was performed in the same manner as in Example 2 to obtain a calcium titanate powder.

Example 13

A calcium titanate powder was obtained in the same manner as in Example 5 except that glucose was changed to sucrose.

Example 14

Using the slurry for which decantation cleaning was completed in Example 13, silicone treatment was performed in the same manner as in Example 2 to obtain a calcium titanate powder.

Comparative Example 1

A calcium titanate powder was obtained in the same manner as in Example 1 except that the addition of sugar such as glucose was set to 0 g. The shape of the primary particles of the calcium titanate powder was rectangular parallelepiped, the average particle size was 425 nm, the value obtained by dividing the quartile deviation by the average particle size was 0.190, the carbon (C) content was 0.2 g/kg, the silicon (Si) content was 0.23 g/kg, the Ca/Ti molar ratio was 0.66, and the specific surface area was 5.3 $m^2/g$. Two phases of perovskite-type calcium titanate and anatase-type titanium dioxide were identified by the powder X-ray diffraction. The improvement rate of the apparent toner density was –0.1%.

Comparative Example 2

Using the slurry for which decantation cleaning was completed in Comparative Example 1, silicone treatment was performed in the same manner as in Example 2 to obtain a calcium titanate powder. The shape of the primary particles of the calcium titanate powder was rectangular parallelepiped, the average particle size as 430 nm, the value obtained by dividing the quartile deviation by the average particle size was 0.198, the carbon (C) content was 0.2 g/kg, the silicon (Si) content was 1.33 g/kg, the Ca/Ti molar ratio was 0.66, and the specific surface area was 6.6 $m^2/g$. Two phases of perovskite-type calcium titanate and anatase-type titanium dioxide were identified by the powder X-ray diffraction. The improvement rate of the apparent toner density was 0.0%.

Comparative Example 3

A calcium titanate powder was obtained in the same manner as in Example 1 except that the amount of glucose added was changed to 0.333 mol.

Comparative Example 4

Using the slurry for which decantation cleaning was completed in Comparative Example 3, silicone treatment was performed in the same manner as in Example 2 to obtain a calcium titanate powder.

Comparative Example 5

A calcium titanate powder was obtained in the same manner as in Example 1 except that the amount of glucose added was changed to 0.017 mol.

Comparative Example 6

Using the slurry for which decantation cleaning was completed in Comparative Example 5, silicone treatment was performed in the same manner as in Example 2 to obtain a calcium titanate powder.

Comparative Example 7

A calcium titanate powder was obtained in the same manner as in Example 5 except that the high-pressure liquid phase reaction temperature was changed to 95° C.

Comparative Example 8

Using the slurry for which decantation cleaning was completed in Comparative Example 7, silicone treatment was performed in the same manner as in Example 2 to obtain a calcium titanate powder.

Comparative Example 9

A calcium titanate powder was obtained in the same manner as in Example 1 except that metatitanic acid in an amount of 0.383 mol in terms of $TiO_2$ was added, 0.011 mol of glucose was added, calcium hydroxide was added so that the molar ratio of Ca/Ti was 1.15, and the temperature of the high-pressure liquid phase reaction was set to 95° C.

Comparative Example 10

Using the slurry for which decantation cleaning was completed in Comparative Example 9, silicone treatment was performed in the same manner as in Example 2 to obtain a calcium titanate powder.

Comparative Example 11

A calcium titanate powder was obtained in the same manner as in Example 5 except that glucose was changed to glycerol.

Comparative Example 12

Using the slurry for which decantation cleaning was completed in Comparative Example 11, silicone treatment was performed in the same manner as in Example 2 to obtain a calcium titanate powder.

Table 1 shows the conditions for production in each Example and Comparative Example. Table 2 shows the conditions for surface treatment in each Example and Comparative Example. Table 3 shows the results of the calcium titanate powder obtained in each Example, and Table 4 shows the results of the calcium titanate powder obtained in each Comparative Example.

TABLE 1

|  | Ti concentration mol/L | Ca/Ti molar ratio | Additive | Additive concentration mol/L | NaOH concentration mol/L | Reaction temperature ° C. | Reaction time h |
|---|---|---|---|---|---|---|---|
| Example 1 | 1.273 | 1.15 | glucose | 0.074 | 1.5 | 150 | 10 |
| Example 3 | 1.273 | 1.15 | glucose | 0.278 | 1.5 | 150 | 10 |
| Example 5 | 1.273 | 1.15 | glucose | 0.148 | 1.5 | 180 | 3 |
| Example 8 | 1.273 | 1.15 | fructose | 0.148 | 1.5 | 180 | 3 |
| Example 11 | 1.273 | 1.15 | maltose | 0.148 | 1.5 | 180 | 3 |
| Example 13 | 1.273 | 1.15 | sucrose | 0.148 | 1.5 | 180 | 3 |
| Comparative Example 1 | 1.273 | 1.15 | none | — | 1.5 | 150 | 10 |
| Comparative Example 3 | 1.273 | 1.15 | glucose | 0.555 | 1.5 | 150 | 10 |
| Comparative Example 5 | 1.273 | 1.15 | glucose | 0.028 | 1.5 | 150 | 10 |
| Comparative Example 7 | 1.273 | 1.15 | glucose | 0.148 | 1.5 | 95 | 10 |
| Comparative Example 9 | 0.639 | 1.15 | glucose | 0.019 | 1.5 | 95 | 10 |
| Comparative Example 11 | 1.273 | 1.15 | glycerol | 0.148 | 1.5 | 180 | 3 |

TABLE 2

| | Base substance | Surface treatment agent | Amount of surface treatment agent added g/kg |
|---|---|---|---|
| Example 2 | Example 1 | silicone | 3 |
| Example 4 | Example 3 | silicone | 3 |
| Example 6 | Example 5 | silicone | 3 |
| Example 7 | Example 5 | i-butyltrimethoxysilane | 103 |
| Example 9 | Example 8 | silicone | 3 |
| Example 10 | Example 8 | i-butyltrimethoxysilane | 77 |
| Example 12 | Example 11 | silicone | 3 |
| Example 14 | Example 13 | silicone | 3 |
| Comparative Example 2 | Comparative Example 1 | silicone | 3 |
| Comparative Example 4 | Comparative Example 3 | silicone | 3 |
| Comparative Example 6 | Comparative Example 5 | silicone | 3 |
| Comparative Example 8 | Comparative Example 7 | silicone | 3 |
| Comparative Example 10 | Comparative Example 9 | silicone | 3 |
| Comparative Example 12 | Comparative Example 11 | silicone | 3 |

TABLE 3

| | Particle shape | Average particle size nm | Quartile deviation/ Average particle size | Presence or absence of $TiO_2$ | Ca/Ti molar ratio | C content g/kg | Si content g/kg | Specific surface area m$^2$/g | Apparent toner density improvement rate % |
|---|---|---|---|---|---|---|---|---|---|
| Example 1 | substantially spherical | 61 | 0.189 | absent | 0.65 | 18.6 | 0.20 | 61 | 0.4 |
| Example 2 | substantially spherical | 60 | 0.190 | absent | 0.65 | 18.8 | 1.30 | 62 | 3.9 |
| Example 3 | substantially spherical | 31 | 0.192 | absent | 0.65 | 33.2 | 0.21 | 116 | 1.0 |
| Example 4 | substantially spherical | 32 | 0.190 | absent | 0.65 | 33.6 | 1.30 | 119 | 5.4 |
| Example 5 | substantially spherical | 34 | 0.208 | absent | 0.67 | 19.6 | 0.23 | 55 | 0.8 |
| Example 6 | substantially spherical | 33 | 0.205 | absent | 0.67 | 20.0 | 1.35 | 58 | 5.1 |
| Example 7 | substantially spherical | 34 | 0.210 | absent | 0.67 | 32.7 | 9.52 | 51 | 7.2 |
| Example 8 | substantially spherical | 49 | 0.226 | absent | 0.66 | 19.4 | 0.23 | 41 | 0.4 |
| Example 9 | substantially spherical | 48 | 0.220 | absent | 0.66 | 19.8 | 1.26 | 42 | 4.0 |
| Example 10 | substantially spherical | 49 | 0.228 | absent | 0.66 | 30.8 | 7.15 | 39 | 6.7 |
| Example 11 | substantially spherical | 39 | 0.185 | absent | 0.65 | 39.0 | 0.22 | 79 | 0.6 |
| Example 12 | substantially spherical | 39 | 0.185 | absent | 0.65 | 39.5 | 1.30 | 80 | 4.8 |
| Example 13 | substantially spherical | 44 | 0.160 | absent | 0.67 | 30.2 | 0.20 | 68 | 0.5 |
| Example 14 | substantially spherical | 43 | 0.165 | absent | 0.67 | 30.5 | 1.34 | 70 | 4.2 |

TABLE 4

| | Particle shape | Average particle size nm | Quartile deviation/ Average particle size | Presence or absence of $TiO_2$ | Ca/Ti molar ratio | C content g/kg | Si content g/kg | Specific surface area $m^2/g$ | Apparent toner density improvement rate % |
|---|---|---|---|---|---|---|---|---|---|
| Comparative Example 1 | rectangular parallelepiped | 425 | 0.190 | present | 0.66 | 0.2 | 0.23 | 5.3 | −0.1 |
| Comparative Example 2 | rectangular parallelepiped | 430 | 0.198 | present | 0.66 | 0.2 | 1.33 | 6.6 | 0.0 |
| Comparative Example 3 | substantially spherical | 13 | 0.458 | present | 0.66 | 53.2 | 0.20 | 133 | 0.6 |
| Comparative Example 4 | substantially spherical | 14 | 0.463 | present | 0.66 | 53.6 | 1.36 | 136 | 6.6 |
| Comparative Example 5 | rectangular parallelepiped | 150 | 0.150 | present | 0.67 | 15.2 | 0.22 | 31 | 0.1 |
| Comparative Example 6 | rectangular parallelepiped | 155 | 0.160 | present | 0.67 | 15.5 | 1.34 | 33 | 1.4 |
| Comparative Example 7 | rectangular parallelepiped | 49 | 0.198 | present | 0.67 | 23.1 | 0.22 | 82 | 0.4 |
| Comparative Example 8 | rectangular parallelepiped | 47 | 0.195 | present | 0.67 | 23.3 | 1.33 | 84 | 3.8 |
| Comparative Example 9 | rectangular parallelepiped | 275 | 0.215 | absent | 0.65 | 15.8 | 0.20 | 5.4 | −0.1 |
| Comparative Example 10 | rectangular parallelepiped | 284 | 0.226 | absent | 0.65 | 16.0 | 1.35 | 6.7 | 0.1 |
| Comparative Example 11 | rectangular parallelepiped | 166 | 0.442 | present | 0.65 | 12.4 | 0.18 | 5.6 | 0.0 |
| Comparative Example 12 | rectangular parallelepiped | 162 | 0.438 | present | 0.65 | 12.6 | 1.29 | 6.5 | 0.2 |

In Comparative Examples 1, 2, and 5 to 12, the shape of particles was rectangular parallelepiped. In Comparative Examples 1 to 8, 11 and 12, a phase of titanium dioxide was observed, failing to fulfill the purpose of developing an alternative material to titanium dioxide. In the powder of the present invention, the titanium dioxide phase was not observed and the apparent toner density improvement rate was generally high. In particular, the apparent toner density improvement rate was remarkably increased by the surface treatment. A high apparent toner density improvement rate generally means that the toner has high fluidity and that the toner particles do not easily aggregate with each other.

The invention claimed is:

1. A powder composed of particles, the particles comprising calcium titanate having a perovskite-type crystal structure as a main component, wherein a shape of primary particles is substantially spherical, and an average particle size of the primary particles is in a range of 20 nm or more and 100 nm or less, wherein
   a molar ratio of calcium to titanium in the particles is in a range of 0.50 or more and 0.80 or less,
   the particles comprise carbon (C) in a range of 10.0 g/kg or more and 50.0 g/kg or less, and
   the particles comprise carbon (C) derived from monosaccharide and/or disaccharide.

2. The powder according to claim 1, wherein the particles do not comprise titanium dioxide.

3. The powder according to claim 1, wherein a value obtained by dividing a volume-based quartile deviation of particle size of the primary particles by an average particle size of the primary particles is 0.250 or less.

4. The powder according to claim 1, wherein the particles comprise carbon (C) in a range of 15.0 g/kg or more and 40.0 g/kg or less.

5. The powder according to claim 1, wherein the particles comprise silicone or a silane coupling agent in a range of 1.00 g/kg or more and 10.00 g/kg or less in terms of silicon (Si).

6. An external additive for a toner for electrophotography, comprising the powder according to claim 1.

7. A method for producing the powder according to claim 1, the method comprising:
   providing a mixed solution comprising a compound obtained by deflocculating a hydrolysate of a titanium compound with a monobasic acid, a water-soluble compound containing calcium, a sugar, and an alkali;
   subjecting the mixed solution to a high-pressure liquid phase reaction method to obtain calcium titanate; and
   subjecting the obtained calcium titanate to a calcium removal treatment,
   wherein a temperature in the high-pressure liquid phase reaction method is 100° C. or more and 270° C. or less.

* * * * *